March 21, 1961 P. L. TALLMAN 2,975,796
IRRIGATION PIPE GATE
Filed May 9, 1958
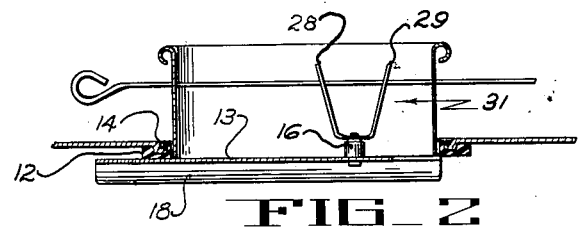
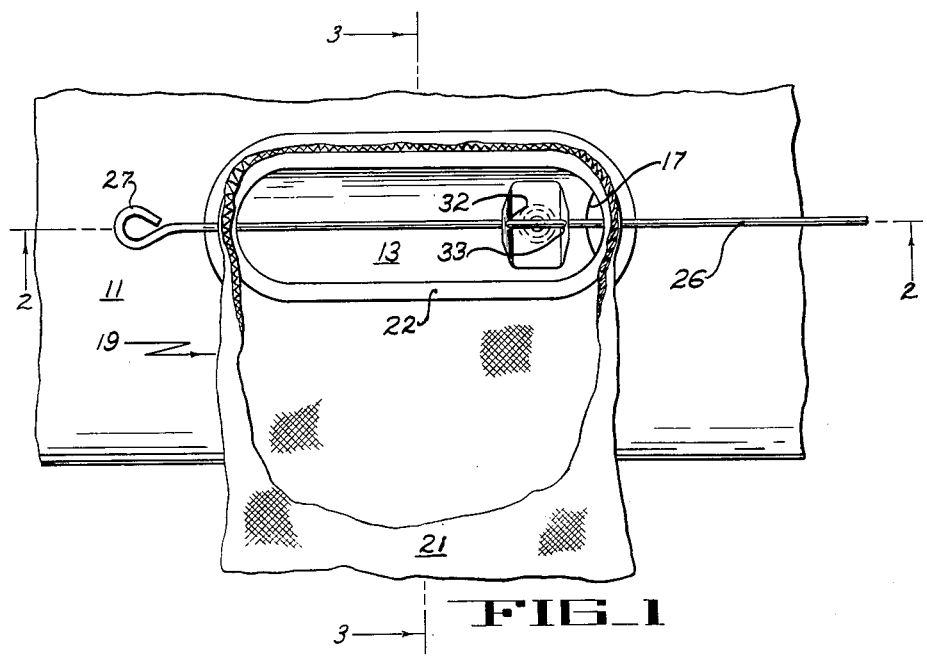
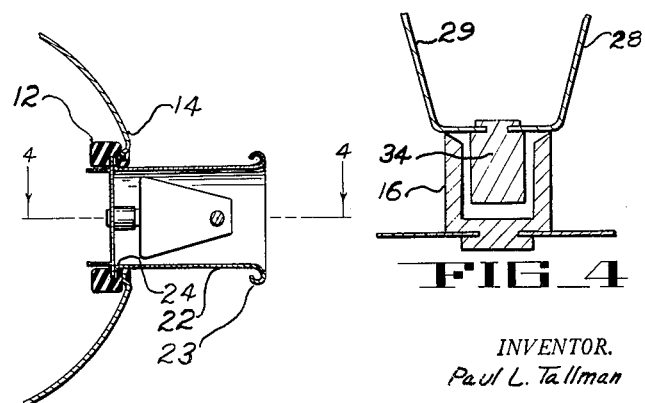
INVENTOR.
Paul L. Tallman
BY Paul Bliven

United States Patent Office 2,975,796
Patented Mar. 21, 1961

2,975,796
IRRIGATION PIPE GATE

Paul L. Tallman, Los Angeles, Calif., assignor, by mesne assignments, to Emerald Distributors, Inc., Salinas, Calif., a corporation of California Filed May 9, 1958, Ser. No. 734,331

2 Claims. (Cl. 137—322)

The present invention relates to a simple form of valve called a gate, and in more particular to a gate such as is found in use in irrigation pipe where such gates are used to control the flow of water from an irrigation pipe to the ends of furrows across which such pipe has been placed.

Irrigation pipe now on the market is provided with gates spaced along the pipe. The spacing of the gates is dependent on the spacing of the rows of the field to be irrigated, a gate for each row. The gate consists of a frame and a slide. The frame is in the general form of an oval ring which is inserted in a suitably shaped opening formed in the pipe. The slide is a flat oblong sheet of metal guided in the rubber frame so that movement of the slide lengthwise thereof opens and closes the frame, or gate, opening for the regulation of the amount of water flowing therethru. A button is secured to the slide for manual engagement to effect such movement. However, it is often desirable to attach a fabric or plastic sleeve to the gate frame to act as a guide and a damper to water flowing from the gate so that the water will not wash the soil in the furrow and create holes therein. The application of such a sleeve to the gate makes the gate slide and slide button inaccessible without removing the sleeve from the gate.

Thus, it is an object of the present invention to devise a simple device which may be associated with the gates and sleeves as now manufactured which will enable the gate slide to be actuated for opening, adjusting and closing the gate while a sleeve is attached to the gate.

It is a further object of the invention to construct such a device so that it will be attached to such sleeve, or a part associated therewith, and be removed from the gate when the sleeve is removed therefrom.

The above mentioned defects of the prior art are remedied and these objects and others are achieved by passing a rod thru the adapter which is conventionally secured to one end of each gate sleeve for insertion part way into the gate frame opening for securing the sleeve and gate frame together. The gate frame opening and the adapter are elongated in one direction and the rod is passed thru the sides of the adapter in this direction and medially thereof. Also, the rod passes thru the legs of a U-shaped spring clip that by its spring action grips the rod and locks in one place therealong by acting as a double opposed friction ratchet. The closed end of the clip engages, or interfits, with the button on the gate slide. Movement of the rod moves the gate slide to open, vary, or close the gate.

An irrigation pipe gate with an attached sleeve and adapter having incorporated therewith the gate slide actuator briefly described above, is hereinafter described in detail and shown in the accompanying drawings, in which:

Figure 1 is a side view of a portion of an irrigation pipe with a gate and sleeve attached thereto, looking at the gate opening with fabric parts of the sleeve broken away, and having incorporated therewith a form of the present invention.

Figure 2 is a section on the line 2—2 of Figure 1.
Figure 3 is a section on the line 3—3 of Figure 1.
In Figures 2 and 3 the fabric sleeve is not shown but the sleeve adapter remains.

Figure 4 is an enlarged sectional view on the line 4—4 of Figure 3.

The sectional views of Figures 2 and 3 illustrate the construction and cooperation between, pipe 11, gate frame 12 and gate slide 13. The opening made in the pipe to receive the gate frame is rectangular with the narrow ends rounded between the long parallel sides, and all the edge portions adjacent to the opening, flanged inwardly of the pipe and inwardly of the opening. The gate frame 12 has the general form of a ring conforming to the pipe opening. A cross-section of the long side of the ring shows it to be S-shaped in form, with the inward flange 14 of the pipe opening fitting in S-shaped recess which is outward of the pipe and the longitudinal edges of the gate slide 13 fitting in the S-shaped recess which is inside of the pipe. The rounded end portions of the inside tail of S-shaped frame are removed so that the slide 13 may be moved longitudinally thereof and of the frame and pipe opening so as to open and close the frame and pipe opening. A cup-ended button 16 is secured to the outer face of the slide adjacent one end thereof. This button serves as a manual hold for the operation of the slide. The end 17 of the slide adjacent the button is inwardly rounded-out so that when the gate opening is just closed, the slide will be supported in the gate frame beyond the point of closure. The slide 13 is provided on its inside face with a pair of spaced apart parallel flanges 18 that provide rigidity for the slide and may bear against the frame to aid in guiding the slide therein when it is moved longitudinally thereof. Such movement of the slide regulates the size of the discharge opening thru the gate and the amount of water which will flow therethru.

The sleeve 19 is used in conjunction with the gate when it is desired to dissipate the kinetic energy of the water leaving the gate and/or to prevent such water from having impact with the ground. The sleeve usually consists of a fabric or plastic sock 21 secured to an adapter 22. The fabric sock is flexible and the adapter is relatively rigid, being usually made out of thin sheet metal. The adapter is shaped in the form of a collar or conduit section to fit in the gate frame opening, and formed with outwardly turned or rolled edges 23, 24. The outer turned edge 23, the sock edge, fits inside the sock 21 and prevents the sock from sliding off this outer end. The inner turned edge 24, the frame edge, aids in frictionally holding the adapter in the gate opening. Figure 1 shows the sleeve with the adapter inserted in the gate frame opening. Parts of the fabric sock have been removed to give a clear view down the gate frame opening. In Figures 2 and 3, the fabric sock has been entirely eliminated but the adapter remains inserted in the gate frame opening.

The above construction of gate and sleeve, sock and adapter, is old in the art. The present invention adds to the sleeve, and particularly to the adapter 22, a device whereby the gate slide may be operated when the sleeve is attached to the gate. The present invention, also, provides an adjustable stop means for limiting the amount of opening movement of the gate slide to a predetermined amount. This device comprises a rod 26 that is passed thru opposed openings in the adapter wall so that the rod extends longitudinally and axially of the adapter, and about midway between the inner and outer edges thereof. The rod slides easily in such wall openings, and is provided with a loop 27 at one end thereof to act as a handhold therefor. The rod, also, passes thru the legs 28, 29 of a U-shaped spring clip 31 that acts as opposed ratchets to hold the clip in place and fixed on the rods. This ratchet action is obtained by forming the U-shaped spring clip from a flat piece of spring material into a U-shape so that in relaxed condition the legs thereof are non-parallel. The legs are then sprung to parallel and the rod holes 32, 33 are drilled therein and in alignment with each other so that when so held in alignment, the rod may be easily slid into and thru such holes but when the legs are not held in parallel they will grip the rod with an opposed ratchet action, one leg against the other. A commonly found door transom operating rod is locked in place by somewhat similar opposed ratchets. The disclosed legs are biased to move from each other to lock the clip to the rod. The closed end of the clip 31 interfits with the slide button 16. In the present showing this interfitting is obtained by providing the outside of the closed end with a ball, or pin, 34 that will loosely fit in the cup of the slide button 16, as illustrated in Figure 4.

With the adapter removed from the gate frame, the rod 26 is easily installed in the adapter 22 and assembled with the slide actuating clip 31. To do so, the rod is held by its end loop 27 and the other end is inserted thru one of the holes in the wall of the adapter; the clip legs 28, 29 are squeezed and held together with the clip leg holes 28, 29 in alignment as the rod is passed thru the holes 32, 33 and slid therethru and thru the other hole in the adapter wall; and the clip legs are then released so that their spring action will lock the legs and the clip to the rod. The rod is long enough and the clip is so located on the rod that the clip can be moved from end to end of the adapter without an end of the rod reaching the adapter. If desired, the clip can be located close enough to the rod end loop 27 so that the loop will act as a stop to limit the travel of the clip and, hence, the slide. This allows the opening or the closing of the slide to be limited to a predetermined position. Once the rod and clip have been assembled with the adapter, it may be inserted in the gate frame opening.

When the adapter is being inserted in the gate frame, the rod is moved so that the clip end pin 34 will be inserted in the cup of the button 16 so that movement of the rod and clip will move the slide 13 in the desired manners. Thus, the gate slide may be adjusted without removing the sleeve from the gate frame and the pipe.

Having thus described by invention, its construction and operation, I claim:

1. An irrigation sleeve adapter, a rod extending across and thru the sides of said adapter for movement longitudinally of said rod, and a part carried by said rod between said sides, said part comprising a U-shaped spring clip having a hole formed in each leg thereof, each hole being of a size to slidingly fit said rod and said holes being in alignment for the free passage of said rod therethru when said legs are sprung toward each other, and said part and clip comprising opposed ratchets for preventing movement of said part on said rod when said legs are released to spring away from each other.

2. An irrigation adapter in the form of a flattened sheet metal collar with rolled edges at each end thereof and the lateral surfaces of said collar being opposed spaced apart flat portions joined by opposed curved portions so that the passageway formed by said collar is elongated transversely thereof by such flattening, each of said rolled edges being in a plane at right angles to the lateral surfaces; a rod extending across such passageway, medially of the flat portions, parallel to such planes, in the direction of such elongation, and slidable thru and beyond the curved portions; and a projection secured to and extending transversely of said rod.

References Cited in the file of this patent

UNITED STATES PATENTS

| | | |
|---|---|---|
| 2,051,484 | Jordon | Aug. 18, 1936 |
| 2,726,120 | Bletcher | Dec. 6, 1955 |